Oct. 18, 1949.　　　　　C. H. DEAN　　　　　2,485,484
BICYCLE SHOCK ABSORBER
Filed March 20, 1946　　　　　　　　　　　2 Sheets-Sheet 1
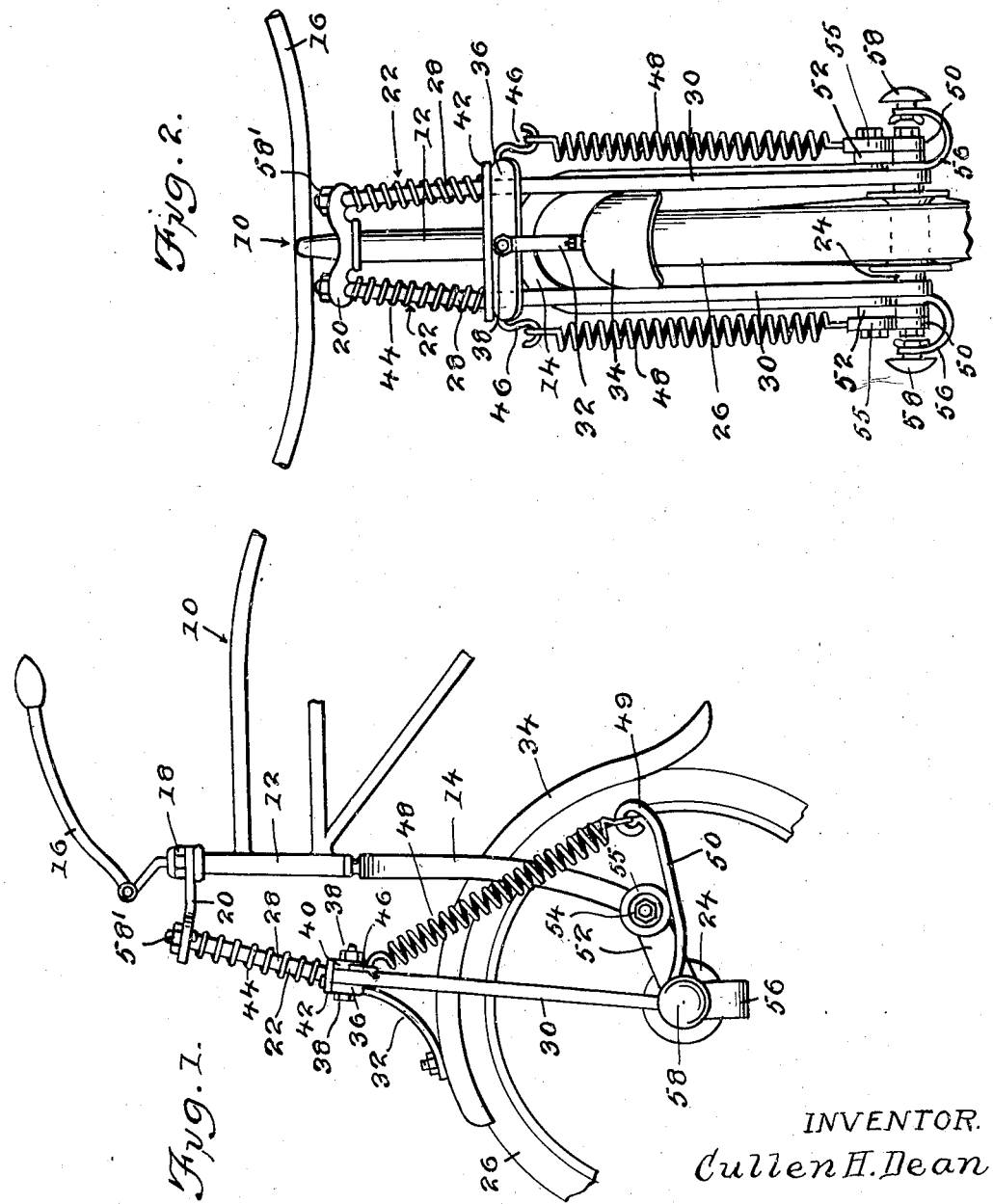
INVENTOR.
Cullen H. Dean
Victor J. Evans & Co.
ATTORNEYS Oct. 18, 1949.  C. H. DEAN  2,485,484
BICYCLE SHOCK ABSORBER
Filed March 20, 1946  2 Sheets-Sheet 2
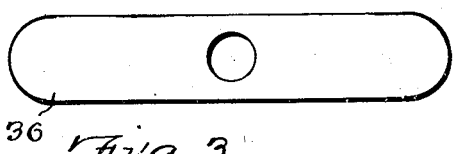
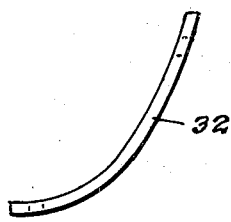
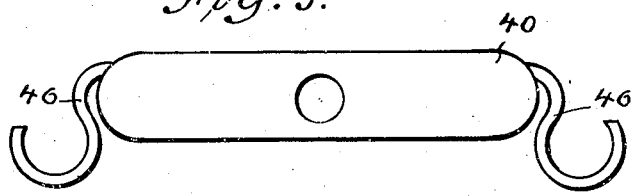
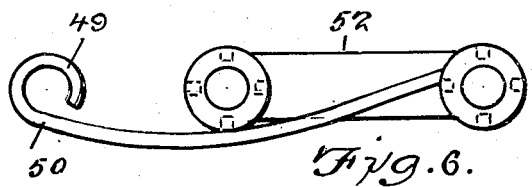
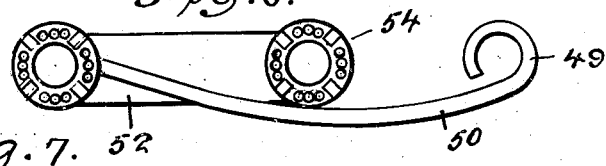
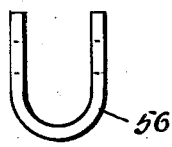
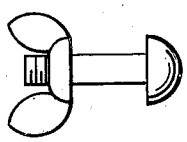
INVENTOR.
Cullen H. Dean
BY Victor J. Evans & Co.
ATTORNEYS Patented Oct. 18, 1949

2,485,484

UNITED STATES PATENT OFFICE 2,485,484

BICYCLE SHOCK ABSORBER

Cullen H. Dean, Flomaton, Ala.

Application March 20, 1946, Serial No. 655,765

1 Claim. (Cl. 280—277)

This invention relates to a shock absorber for a bicycle.

An object of the invention is to provide a device which will absorb shocks from bumps or other irregularities encountered in the surface over which the bicycle is traveling thus assuring a compartively smooth level ride.

With the above and other objects in view the invention consists of the novel details of construction, arrangement and combination of parts more fully hereinafter described, claimed and illustrated in the accompanying drawings in which:

Figure 1 is a side elevational view of an embodiment of the invention;

Figure 2 is a front elevation thereof;

Figure 3 is an elevational view of the front clamp;

Figure 4 is an elevational view of the rear clamp;

Figure 5 is an elevational view of the fender brace;

Figure 6 is an elevational view of one side of the lower spring suspension;

Figure 7 is an elevational view of the opposite side;

Figure 8 is an elevational view of the reflector support;

Figure 9 is an elevational view of the reflector;

Figure 10 is an elevational view of one of the main springs and

Figure 11 is an elevational view of an overload spring.

Referring more in detail to the drawings the reference numeral 10 designates generally a bicycle comprising a frame 12 including the front fork 14 and handle bars 16 connected to the fork in the conventional manner by the coupling 18.

Secured to the frame 12 by the coupling 18 is a support 20 having opposed parallel rods 22 slidably mounted therein at the upper end thereof. The rods extend downwardly and have the axle 24 for the front wheel 26 journalled therein.

The rods have the inwardly and rearwardly inclined portions 28 and the straight portions 30.

A curved fender brace 32 secured at the lower end to the fender 34 is secured at the upper end to the front clamping bar 36 which extends transversely of the rods 22 by a bolt 38 which also retains the rear clamping bar 40 in position in the rear of and in alignment with the bar 36.

A spring supporting bar 42 is seated on the bars 36 and 40 to support the overload springs 44 mounted on the portions 28 of the rods 22.

The bar 40 is provided with hooks 46 on the opposite ends thereof to receive the upper ends of the springs 48, the lower ends of which are engaged with the looped ends 49 of the spring suspension arms 50 which are mounted on the opposed arms 52 connected to the axle 24 and the lower ends of the fork 14, the arms 52 are provided with bearings 54 at their connecting points.

Rollers 55 are mounted on the bearings 54 at the connecting points of the forks 14 and arms 52 and the rollers 55 are adapted to have rotational engagement with the arms 50 and act as fulcrum points for the movement of the arms 50.

The ends of the axles are provided with U-shaped clamps 56 adapted to hold reflectors 58 thereon and the rods 22 are provided with nuts 58 to limit their downward movement.

During operation any shocks to the wheel 26 will be absorbed by the springs 48 which are normally pulling upwardly on the arms 52 and any overload on the bicycle will be absorbed by the springs 44. The rods 22 slide through the support 20 to provide movement of the wheel to absorb the shock.

It is believed that the operation and construction of the device will be apparent to those skilled in the art and it is to be understood that changes in the arrangement of parts and details of construction may be resorted to provided they fall within the spirit of the invention and the scope of the appended claim.

Having thus described the invention, what is claimed as new and desired to be secured by Letters Patent is:

A device of the character described in combination with a bicycle including a frame, a front fork, an axle, and a wheel on the axle, comprising a support secured to the frame above the plane of the axle, a pair of rods fixed at their lower ends to the opposite ends of the axle and slidably mounted at their upper ends in the support, a pair of opposed parallel arms each pivoted at one of their ends to the axle and at their opposite ends to the lower ends of the fork, a pair of spring suspension arms pivoted at one end of the axle and having loops at their opposite ends, a roller carried by the fork outwardly of the first pair of arms and engaging the second pair of arms to provide a fulcrum point for said second pair of arms, a bar fixed to said rods below said support, springs on said rods engaging said support at their upper ends and said bar at their lower ends and springs connected to the opposite ends of the bar and to the loops on the ends of the second pair of arms to absorb shocks which may be encountered by the bicycle.

CULLEN H. DEAN.

REFERENCES CITED

The following references are of record in the file of this patent:

FOREIGN PATENTS

| Number | Country | Date |
|---|---|---|
| 8,899 | Great Britain | Oct. 13, 1910 |
| 20,844 | France | Apr. 3, 1919 |
| 26,401 | France | July 3, 1923 |
| 370,789 | France | Jan. 3, 1907 |